United States Patent
Zhou (10) Patent No.: US 10,397,217 B2
(45) Date of Patent: Aug. 27, 2019

(54) AUTHENTICATION METHODS AND AUTHENTICATION APPARATUSES

(71) Applicant: Beijing Zhigu Rui Tuo Tech Co., Ltd, Beijing (CN)

(72) Inventor: Hanning Zhou, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 250 days.

(21) Appl. No.: 15/324,638

(22) PCT Filed: Jun. 5, 2015

(86) PCT No.: PCT/CN2015/080842
§ 371 (c)(1),
(2) Date: Jan. 6, 2017

(87) PCT Pub. No.: WO2016/004804
PCT Pub. Date: Jan. 14, 2016

(65) Prior Publication Data
US 2017/0208058 A1     Jul. 20, 2017

(30) Foreign Application Priority Data
Jul. 7, 2014   (CN) .......................... 2014 1 0321327

(51) Int. Cl.
*H04L 29/06* (2006.01)
*H04L 9/08* (2006.01)
*H04L 9/32* (2006.01)

(52) U.S. Cl.
CPC .......... *H04L 63/083* (2013.01); *H04L 9/0863* (2013.01); *H04L 9/3226* (2013.01); *H04L 63/061* (2013.01); *H04L 63/0428* (2013.01)

(58) Field of Classification Search
CPC ... H04L 63/083; H04L 9/0863; H04L 9/3226; H04L 63/061; H04L 63/123;
(Continued)

(56) References Cited

U.S. PATENT DOCUMENTS 9,590,808 B2 * 3/2017 Jiang ................. H04L 9/3226
9,742,765 B2 * 8/2017 Toyonaga ............ H04L 63/123
2007/0271458 A1 11/2007 Bosch et al.

FOREIGN PATENT DOCUMENTS

CN          101098232 A     1/2008
CN          101174953 A     5/2008
(Continued)

OTHER PUBLICATIONS

International Search Report for PCT Application No. PCT/CN2015/080842, dated Sep. 9, 2015, 3 pages.
(Continued)

*Primary Examiner* — Thanhnga B Truong
(74) *Attorney, Agent, or Firm* — Amin, Turocy & Watson, LLP (57) ABSTRACT

Authentication methods and apparatuses are provided. The authentication method comprises: acquiring, from a server, first server authentication information of a user, the first server authentication information being encrypted by using at least one first key obtained from a first number of characters in a user password of the user; acquiring the first number of characters input by the user in a password input area; decrypting the first server authentication information by using at least one second key obtained from the first number of characters input; feeding back at least one first authentication response to the user at least according to the decrypted first server authentication information; and sending an authentication request to the server based on a server authentication pass instruction of the user, the authentication request being used to request the server to authenticate the user.

25 Claims, 3 Drawing Sheets

(58) Field of Classification Search
CPC ............. H04L 63/0876; H04L 63/0428; H04L 63/0435; H04L 2209/56
USPC ..................................... 713/171; 726/2, 3, 4
See application file for complete search history.

(56) References Cited

FOREIGN PATENT DOCUMENTS

| | | |
|---|---|---|
| CN | 101369894 A | 2/2009 |
| CN | 101449549 A | 6/2009 |
| CN | 103281340 A | 9/2013 |
| CN | 104079577 A | 10/2014 |

OTHER PUBLICATIONS

Chinese Office Action dated Sep. 4, 2018 for Chinese Patent Application No. 201410321327.9, 20 pages (with translation).

* cited by examiner

AUTHENTICATION METHODS AND AUTHENTICATION APPARATUSES

RELATED APPLICATION

The present application is a U.S. National Stage filing under 35 U.S.C. § 371 of international patent cooperation treaty (PCT) application No. PCT/CN2015/080842, filed Jun. 5, 2015, and entitled "AUTHENTICATION METHODS AND AUTHENTICATION APPARATUSES", which claims the benefit of priority to Chinese Patent Application No. 201410321327.9, filed on Jul. 7, 2014, which applications are hereby incorporated into the present application by reference herein in their respective entireties.

TECHNICAL FIELD

Embodiments of the present application relate to the field of security technologies, and in particular, to authentication methods and authentication apparatuses.

BACKGROUND

A phishing attack defrauds users' personal information by counterfeiting user interfaces of legitimate websites. With respect to such an attack, important websites will confirm their own authenticity to users. A common method is Sitekey, a technology that prevents phishing based on challenge-response. It comprises the following steps: a user inputs his/her own user name in a login interface of a website without inputting a password; an image or a sentence preset by the user is displayed in the login interface of the website, if the displayed content is not in conformity with the content preset by the user, the user can decide that the website is not real, and if the displayed content is in conformity with the content preset by the user, the user can decide that the website is real; if the user decides that the website is real, the user can input a login password in the login interface of the website; and the website authenticates identity of the user, and allows the user to log in.

With respect to the above-mentioned scheme, hackers can implement the following man-in-the-middle attack: using phishing to counterfeit a login interface so as to acquire a user name, obtaining Sitekey from a real website by using the user name, that is, an image or a sentence preset by the user, counterfeiting the login interface by using the stolen Sitekey, and tricking the user into inputting a login password.

SUMMARY

In view of this, one example, non-limiting objective of the embodiments of the present application is to provide an authentication scheme.

To achieve the objective, in one aspect, one or more example embodiments of the present application provide an authentication method, comprising:

acquiring, from a server, first server authentication information of a user, the first server authentication information being encrypted by using at least one first key obtained from a first number of characters in a user password of the user;

acquiring the first number of characters input by the user in a password input area;

decrypting the first server authentication information by using at least one second key obtained from the first number of characters input;

feeding back at least one first authentication response to the user at least according to the decrypted first server authentication information; and sending an authentication request to the server based on a server authentication pass instruction of the user, the authentication request being used to request the server to authenticate the user.

To achieve the objective, in another aspect, one or more of the example embodiments of the present application provide an authentication apparatus, comprising:

a first acquisition module, configured to acquire, from a server, first server authentication information of a user, the first server authentication information being encrypted by using at least one first key obtained from a first number of characters in a user password of the user;

a second acquisition module, configured to acquire the first number of characters input by the user in a password input area;

a first decryption module, configured to decrypt the first server authentication information by using at least one second key obtained from the first number of characters input;

a first feedback module, configured to feed back at least one first authentication response to the user at least according to the decrypted first server authentication information; and an authentication request module, configured to send an authentication request to the server based on a server authentication pass instruction of the user, the authentication request being used to request the server to authenticate the user.

At least one technical solution in the above example embodiments can have the following beneficial effects:

one or more of the example embodiments of the present application provide an authentication scheme, and ensure security of a user by authenticating, by the user, a server according to feedback in a process of inputting a user password before the server authenticates the user, and further, transmitted server authentication information is encrypted by using characters in the user password, thereby reducing the risk that the server authentication information is stolen.

BRIEF DESCRIPTION OF THE DRAWINGS

FIGS. 2b-2d are respectively schematic structural diagrams of an example embodiment shown in FIG. 2a;

DETAILED DESCRIPTION

Example embodiments of the present application are described in detail hereinafter with reference to the accompanying drawings and embodiments. The following embodiments are intended to describe the present application, but not to limit the scope of the present application.

Figure 1:
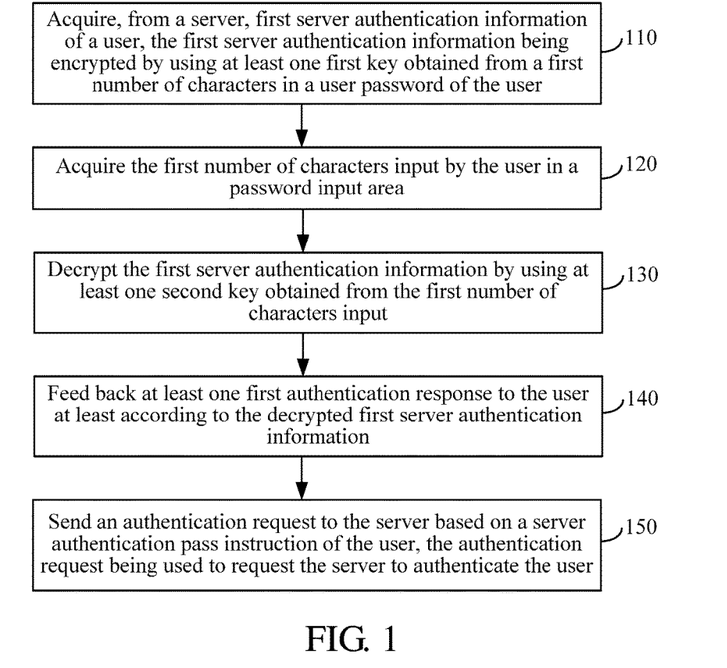
FIG. 1 is a schematic flowchart of an example embodiment of an authentication method according to the present application.

FIG. 1 is a schematic flowchart of an example embodiment of an authentication method according to the present application. As shown in FIG. 1, this embodiment comprises:

110. Acquire, from a server, first server authentication information of a user, the first server authentication information being encrypted by using at least one first key obtained from a first number of characters in a user password of the user.

For example, an authentication apparatus according to the present application performs the method in this example embodiment, that is, the authentication apparatus performs 110-150. The authentication apparatus may be disposed in a user equipment, and the user equipment, for example, may be a smart phone, a PAD, a personal computer or the like.

Optionally, 110 is: acquire at least one character input by the user in a user ID input area, that is, user ID of the user, send the user ID to the server, and receive first server authentication information corresponding to the user ID returned by the server.

120. Acquire the first number of characters input by the user in a password input area.

For example, the password input area may be at least one password input box provided by a user interface.

In this embodiment, the first number may be one, two, or other number.

130. Decrypt the first server authentication information by using at least one second key obtained from the first number of characters input.

The at least one first key and the at least one second key may be the same or different. In this regard, if a symmetric encryption algorithm is used, that is, keys used in encryption and decryption are the same, the at least one first key and the at least one second key may be the same, and if an asymmetrical encryption algorithm is used, that is, keys used in encryption and decryption are different, the at least one first key and the at least one second key may be different.

140. Feed back at least one first authentication response to the user at least according to the decrypted first server authentication information.

There may be many kinds of forms of the at least one first authentication response, and correspondingly, the feeding back may be respectively feeding back at least one first authentication response according to the form of the at least one first authentication response. Optionally, the at least one first authentication response comprises at least one response in at least one form of the following: hearing, touch, vision, taste, smell and temperature. For example, the response in the form of hearing may comprise: a tune or a change in a keyboard sound; the response in the form of touch may comprise: a change in tactility of a user contact area, for example, a certain button projects; the response in the form of vision may comprise: an image and/or a change in a background color of the password input area; the response in the form of taste may comprise: controlling a certain accessory in the oral cavity to release a certain taste; the response in the form of smell may comprise: release of a certain smell; and the response in the form of temperature may comprise: a change in the temperature of the user contact area.

150. Send an authentication request to the server based on a server authentication pass instruction of the user, the authentication request being used to request the server to authenticate the user.

Usually, the decrypted first server authentication information in 140 is in conformity with the user's pre-agreement. For example, a user can set first server authentication information about an online banking server of Bank A and a user password for logging on to the online banking server, and the online banking server encrypts and then locally stores the first server authentication information set by the user by using at least one first key obtained from a first number of characters in the user password; if the user performs input in a password input area according to the user password, that is, the user performs input correctly, correspondingly, in 120, the first number of characters input by the user in a password input area can be acquired, and at least one second key obtained from the first number of characters input is in conformity with the at least one first key, that is, information encrypted by using the at least one first key can be decrypted by using the at least one second key, therefore, in 130, the first server authentication information can be successfully decrypted, in 140, the decrypted first server authentication information is generally in conformity with first server authentication information previously set by the user, so, the at least one first authentication response obtained at least according to the decrypted first server authentication information is generally as expected by the user; on the contrary, if the user does not perform input in the password input area according to the user password, that is, the user performs input incorrectly, the first number of characters input by the user in a password input area cannot be acquired, alternatively, the authentication apparatus acquires at least one character different from the first number of characters, further, at least one second key obtained from the acquired at least one character is not in conformity with the at least one first key, and the first server authentication information cannot be decrypted successfully, and correspondingly, feedback cannot be given to the user. For the user, if the at least one first authentication response fed back in 140 is as expected by the user, it can be considered that authentication on the server is passed, and the server authentication pass instruction is given by the user.

Optionally, the server authentication pass instruction is sent by the user after confirming that the at least one first authentication response is correct.

Optionally, after 150, this embodiment further comprises: receiving an authentication result from the server. Generally, the authentication result is that the authentication is passed or the authentication is not passed.

This embodiment provides an authentication scheme, and ensures security of a user by authenticating, by the user, a server according to feedback in a process of inputting a user password before the server authenticates the user, and further, transmitted server authentication information is encrypted by using characters in the user password, thereby reducing the risk that the server authentication information is stolen.

This embodiment is further described below through some example embodiments.

In this embodiment, optionally, the first number of characters do not comprise the last character of the user password. For example, the user password is six characters "ABCDEF", the first number is 3, and the first number of characters may be "ABC", "ACD", "DBE" and the like.

As the first number of characters do not comprise the last character of the user password, in this embodiment, 110-140 may be performed before the user inputs the last character of the user password, and correspondingly, the user can confirm whether the at least one first authentication response is in conformity with a preset one before inputting the last character of the user password, that is, the user can determine whether authentication on the server is passed, and stop continuously inputting subsequent characters of the user password when the authentication on the server is not passed, thereby reducing the risk that the user password is stolen.

In this embodiment, optionally, the first number of characters are pre-agreed by the user.

Specifically, the user agrees on using which characters in his/her own user password to obtain the at least one first key used to encrypt the first server authentication information, that is, the user agrees on a sorted order of each character in the first number of characters in the user password, or agrees on the last character in the first number of characters is which character in the user password, that is, agrees on a sorted order of the last character in the first number of characters in the user password; in this way, the user can expect a character of the user password, and after the moment when the character is input in the password input area, authentication apparatus can decrypt the first server authentication information, so that the user can obtain the at least one first authentication response.

In this embodiment, for an execution body of this embodiment, which one/ones in at least one character input by the user in the password input area can be a first number of characters used to obtain the at least one second key, can refer to local configuration, or be notified by the server, or be indicated by the user.

In one example embodiment, the same sorted order of characters for obtaining keys in the user password is set in both the server and the authentication apparatus. For example, the same sorted order is first to third characters, correspondingly, the server extracts the first to third characters in the user password according to the same sorted order and obtains at least one first key used to encrypt the first server authentication information according to the first to third characters, and the authentication apparatus acquires the first to third characters input by the user in the password input area according to the same sorted order and obtains at least one second key used to decrypt the first server authentication information according to the first to third characters.

It should be noted that, the steps of extracting the first number of characters from the user password and obtaining the at least one first key and encrypting by using the at least one first key can be performed by the server or performed by another device. When the steps are performed by the another device, the same sorted order is set in the another device and the authentication apparatus, and correspondingly, the another device can send the encrypted first server authentication information to the server.

In another example embodiment, this embodiment further comprises: acquiring, from the server, a sorted order of the first number of characters in the user password; and the acquiring the first number of characters input by the user in a password input area comprises: acquiring the first number of characters input by the user in a password input area according to the sorted order.

For example, the sorted order acquired from the server is first, second and fourth, that is, at least one first key used to encrypt the first server authentication information is obtained from the first, second and fourth characters in the user password, and correspondingly, in 120, first, second and fourth characters input by the user in the password input area are acquired, and at least one second key used to decrypt the first server authentication information is obtained from the input first, second and fourth characters.

Optionally, the first server authentication information and the sorted order can be acquired from the server at the same time.

In this embodiment, there may be many kinds of manners of obtaining at least one first key from a first number of characters in a user password of the user, that is, there may be many kinds of key generation strategies. For example, the at least one first key may comprise the first number of characters per se, and/or at least one character obtained after certain conversion of the first number of characters, the conversion comprising: conversion of permutation and combination, and/or corresponding conversion of public and private keys. For example, the first number of characters are "ABC", and the at least one first key may be "ABC", "ABCABC", "AABBCC", or public keys corresponding to private keys "ABC", "ABCABC" and "AABBCC", or the at least one first key comprises "ABC", "ABCABC" and a public key corresponding to a private key "AABBCC".

Correspondingly, the key generation strategy of obtaining the at least one second key should be in conformity with the key generation strategy of obtaining the at least one first key, and specifically, r the key generation strategy of obtaining the at least one second key can refer to local configuration, or be notified by the server.

In one example embodiment, a corresponding key generation strategy is set in both the server and the authentication apparatus. For example, the following key generation strategy is set in both the server and the authentication apparatus: cyclically shift the first number of characters to the left by one bit to obtain a key; correspondingly, the server cyclically shifts the first number of characters in the user password to the left by one bit to obtain a first key used to encrypt first server authentication information according to the key generation strategy and encrypts the first server authentication information by using the first key according to a symmetric encryption algorithm, and the authentication apparatus acquires a first number of characters input by the user in the password input area, cyclically shifts the first number of characters to the left by one bit to obtain a second key used to decrypt first server authentication information according to the key generation strategy and decrypts the first server authentication information by using the second key. For another example, the following key generation strategy is set in both the server and the authentication apparatus: taking the first number of characters as a private key, that is, decryption key, and taking a public key corresponding to the private key as an encryption key; correspondingly, the server takes a public key corresponding to the first number of characters in the user password as a first key used to encrypt first server authentication information according to the key generation strategy and encrypts the first server authentication information by using the first key according to an asymmetric encryption algorithm, and the authentication apparatus acquires a first number of characters input by the user in the password input area, takes the first number of characters as a second key used to decrypt first server authentication information according to the key generation strategy and decrypts the first server authentication information by using the second key.

It should be noted that, the step of obtaining the at least one first key from the first number of characters may be performed by the server or performed by another device. When the step is performed by the another device, a corresponding key generation strategy is set in both the another device and the authentication apparatus, and correspondingly, the another device can send the obtained at least one first key to the server, to cause the server to encrypt the first server authentication information by using the at least one first key, or the another device can send the first server authentication information encrypted by using the obtained at least one first key to the server.

In another example embodiment, this embodiment further comprises: acquiring, from the server, a key generation strategy of obtaining the at least one first key from the first number of characters in the user password; and the decrypting the first server authentication information by using at least one second key obtained from the first number of characters input comprises:

obtaining at least one second key according to the first number of characters input and the key generation strategy; and decrypting the first server authentication information by using the at least one second key.

For example, the key generation strategy acquired from the server is taking the first number of characters as a key, and correspondingly, in 120, the first number of characters input by the user in the password input area are acquired, and the first number of characters input are taken as a second key to decrypt the first server authentication information.

Optionally, the first server authentication information and the key generation strategy can be acquired from the server at the same time.

Optionally, the first server authentication information, the key generation strategy and the sorted order can be acquired from the server at the same time.

In this embodiment, there may be many kinds of content of the decrypted first server authentication information.

In one example embodiment, the decrypted first server authentication information comprises: the at least one first authentication response. For example, the decrypted first server authentication information comprises an image, and correspondingly, in 140, the image is displayed to the user.

In another example embodiment, the decrypted first server authentication information comprises: a corresponding relation between characters and responses. Correspondingly, the feeding back at least one first authentication response to the user at least according to the decrypted first server authentication information comprises:

determining at least one first authentication response corresponding to at least one character input by the user in the password input area and feeding back the at least one first authentication response to the user according to the decrypted first server authentication information.

For example, in the corresponding relation, a character "A" corresponds to an authentication response 1, characters "ABC" corresponds to an authentication response 2, and characters "DCE" corresponds to an authentication response 3.

Specifically, the at least one first authentication response corresponding to the at least one character input by the user in the password input area may be at least one first authentication response corresponding to all characters input by the user in the password input area, or at least one first authentication response corresponding to the last character input by the user in the password input area, or may comprise at least one authentication response corresponding to each character input by the user in the password input area, which is not limited in this embodiment.

In this embodiment, in order to enhance the strength of authentication on the server, in addition to the first server authentication information, other server authentication information also exists; correspondingly, other authentication responses, in addition to the at least one authentication response, are also fed back to the user, and the user can determine whether the authentication on the server is passed according to whether all the authentication responses are as expected.

In one example embodiment, before 150, the method further comprises:

acquiring, from the server, second server authentication information of the user, the second server authentication information being encrypted by using at least one third key obtained from a second number of characters in the user password which are different from the first number of characters;

acquiring the second number of characters input by the user in the password input area;

decrypting the second server authentication information by using at least one fourth key obtained from the second number of characters input; and feeding back at least one second authentication response to the user at least according to the decrypted second server authentication information.

In this example embodiment, the second number may be one, two, or other number.

The second number of characters may be exactly or partially different from the first number of characters. Specifically, the difference comprises: different sorted orders of characters in the user password, and/or different values of the characters, and/or different numbers of the characters.

Optionally, the second number of characters comprise at least one character in the user password except the first number of characters. For example, the first number of characters are first to third characters in the user password, the second number of characters are third to fourth characters in the user password, or the second number of characters are third to fifth characters in the user password, or the like.

The at least one third key and the at least one fourth key may be the same or different. specifically, if a symmetric encryption algorithm is used, that is, keys used in encryption and decryption are the same, the at least one third key and the at least one fourth key may be the same, and if an asymmetrical encryption algorithm is used, that is, keys used in encryption and decryption are different, the at least one third key and the at least one fourth key may be different. Reference can be made to the description about the at least one first key and the at least one second key for details, which is not repeated herein.

In the example embodiment, the server authentication pass instruction is generally sent by the user after confirming that the at least one first authentication response and the at least one second authentication response are correct.

In this embodiment, there may be many kinds of the authentication request.

Optionally, the authentication request comprises: all characters input by the user in the password input area, and/or a decryption success instruction of the first server authentication information, and/or a decryption success instruction of the second server authentication information.

Specifically, the all characters input by the user in the password input area are generally the user password of the user, and correspondingly, the server can verify whether the user password in the authentication request is in conformity with the user password of the user locally stored; optionally, if yes, the authentication of the server on the user is passed, and otherwise, the authentication is not passed.

Specifically, if, in 130, the first server authentication information is successfully decrypted, it indicates that the user correctly inputs the first number of characters, correspondingly, the decryption success instruction of the first server authentication information can notify the server that the user correctly inputs the first number of characters, and correspondingly, the server can determine that the authentication on the user is passed according to the decryption success instruction of the first server authentication information. Optionally, if, in 130, decryption of the first server authentication information fails, 140-150 cannot be performed, alternatively, the authentication apparatus can send a decryption failure instruction of the first server authentication information to the server, and correspondingly, the server can determine that the authentication on the user is not passed according to the decryption failure instruction of the first server authentication information.

Optionally, if the first server authentication information and the second server authentication information are both successfully decrypted, it indicates that the user correctly inputs the first number of characters and the second number of characters, correspondingly, the decryption success instruction of the first server authentication information and the decryption success instruction of the second server authentication information can notify the server that the user correctly inputs the first number of characters and the second number of characters, and correspondingly, the server can determine that the authentication on the user is passed according to the decryption success instruction of the first server authentication information and the decryption success instruction of the second server authentication information.

In one possible application scenario of this embodiment, a user Zhangsan agrees on with a service provider A in advance user name "Zhangsan" and user password "122334" used to log on to a server of the service provider A, as well as first server authentication information about the server, specifically, first server authentication information comprises that when a character input by the user in the password input area is respectively 1-6, the background color of the password input area is changed into red, orange, yellow, green, purple and white respectively, and further, the user agrees on taking the first two bits of the user password as a first number of characters, and takes the first number of characters as a first key to encrypt the first server authentication information. When a user accesses the server of the service provider A through a browser on his/her own user equipment, the server provides the user equipment with an authentication apparatus in a form of a browser plug-in, or an authentication apparatus is embedded into a webpage script to be provided for the user equipment; at first, the user inputs "Zhangsan" in a user name input area of a browser interface of the server, the authentication apparatus sends the user name "Zhangsan" to the server, and receives first server authentication information corresponding to "Zhangsan", a sorted order of the first number of characters in the user password (i.e., the first and the second) and a key generation strategy (i.e., the first number of characters are taken as a key) returned by the server, when the user inputs two characters sequentially in the password input area, the authentication apparatus takes the two characters as a key to decrypt the first server authentication information received from the server, if the two characters input by the user sequentially in the password input area are 1 and 2 respectively, the authentication apparatus can perform decryption successfully, and otherwise, the decryption fails; if the decryption succeeds, the authentication apparatus changes the background color of the password input area into orange according to the character "2" input by the user just now, the user can continuously input next character "2" after determining that the background color of the password input area being changed into orange is as expected, the authentication apparatus determines not to change the background color of the password input area according to the first server authentication information, the user can continuously input next character "3" after determining that the background color of the password input area remaining orange is as expected, the authentication apparatus changes the background color of the password input area into yellow according to the first server authentication information, the user can continuously input next character "3" after determining that the background color of the password input area being changed into yellow is as expected, the authentication apparatus determines not to change the background color of the password input area according to the first server authentication information, the user can continuously input next character "4" after determining that the background color of the password input area remaining yellow is as expected, the authentication apparatus changes the background color of the password input area into green according to the first server authentication information, the user can click a "login" button after determining that the background color of the password input area being changed into green is as expected, the authentication apparatus receives a server authentication pass instruction triggered by the "login" button, and correspondingly, the authentication apparatus sends an authentication request to the server.

Figure 2A:
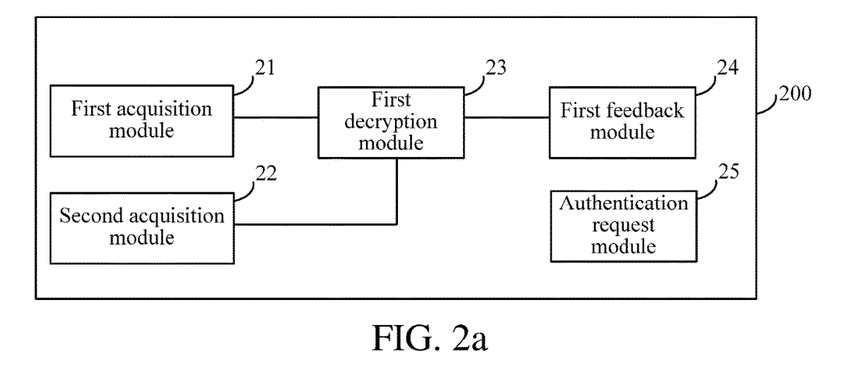
FIG. 2a is a schematic structural diagram of an example embodiment of an authentication apparatus according to the present application.

FIG. 2*a* is a schematic structural diagram of an embodiment of an authentication apparatus according to the present application. As shown in FIG. 2*a*, the authentication apparatus 200 comprises:

a first acquisition module 21, configured to acquire, from a server, first server authentication information of a user, the first server authentication information being encrypted by using at least one first key obtained from a first number of characters in a user password of the user;

a second acquisition module 22, configured to acquire the first number of characters input by the user in a password input area;

a first decryption module 23, configured to decrypt the first server authentication information by using at least one second key obtained from the first number of characters input;

a first feedback module 24, configured to feed back at least one first authentication response to the user at least according to the decrypted first server authentication information; and an authentication request module 25, configured to send an authentication request to the server based on a server authentication pass instruction of the user, the authentication request being used to request the server to authenticate the user.

For example, the authentication apparatus 200 may be disposed in a user equipment, and the user equipment, for example, may be a smart phone, a PAD, a personal computer or the like.

Optionally, the first acquisition module 21 is configured to: acquire at least one character input by the user in a user ID input area, that is, user ID of the user, send the user ID to the server, and receive first server authentication information corresponding to the user ID returned by the server.

For example, the password input area may be at least one password input box provided by a user interface.

In this embodiment, the first number may be one, two, or other number.

The at least one first key and the at least one second key may be the same or different. If a symmetric encryption algorithm is used, that is, keys used in encryption and decryption are the same, the at least one first key and the at least one second key may be the same, and if an asymmetrical encryption algorithm is used, that is, keys used in encryption and decryption are different, the at least one first key and the at least one second key may be different.

There may be many kinds of forms of the at least one first authentication response, and correspondingly, the feeding back may be respectively feeding back at least one first authentication response according to the form of the at least one first authentication response. Optionally, the at least one first authentication response comprises at least one response in at least one form of the following: hearing, touch, vision, taste, smell and temperature. For example, the response in the form of hearing may comprise: a tune or a change in a keyboard sound; the response in the form of touch may comprise: a change in tactility of a user contact area, for example, a certain button projects; the response in the form of vision may comprise: an image and/or a change in a background color of the password input area; the response in the form of taste may comprise: controlling a certain accessory in the oral cavity to release a certain taste; the response in the form of smell may comprise: release of a certain smell; and the response in the form of temperature may comprise: a change in the temperature of the user contact area.

Usually, the decrypted first server authentication information obtained after decryption by the first decryption module 23 is in conformity with the user's pre-agreement. For example, a user can set first server authentication information about an online banking server of Bank A and a user password for logging on to the online banking server, and the online banking server encrypts and then locally stores the first server authentication information set by the user by using at least one first key obtained from a first number of characters in the user password; if the user performs input in a password input area according to the user password, that is, the user performs input correctly, correspondingly, the second acquisition module 22 can acquire the first number of characters input by the user in a password input area, and at least one second key obtained from the first number of characters input is in conformity with the at least one first key, therefore, the first decryption module 23 can successfully decrypt the first server authentication information, and the decrypted first server authentication information is generally in conformity with first server authentication information previously set by the user, that is, information encrypted by using the at least one first key can be decrypted by using the at least one second key, so, the at least one first authentication response obtained by the first feedback module 24 at least according to the decrypted first server authentication information is generally as expected by the user; on the contrary, if the user does not perform input in the password input area according to the user password, that is, the user performs input incorrectly, the second acquisition module 22 cannot acquire the first number of characters input by the user in a password input area, alternatively, the second acquisition module 22 acquires at least one character different from the first number of characters, further, at least one second key obtained from the acquired at least one character is not in conformity with the at least one first key, and the first decryption module 23 cannot successfully decrypt the first server authentication information, and correspondingly, the first feedback module 24 cannot give feedback to the user. For the user, if the at least one first authentication response fed back by the first feedback module 24 is as expected by the user, it can be considered that authentication on the server is passed, and the server authentication pass instruction is given by the user.

Optionally, the server authentication pass instruction is sent by the user after confirming that the at least one first authentication response is correct.

Optionally, this embodiment further comprises: a receiving module, configured to receive an authentication result from the server after the authentication request module 25 sends an authentication request to the server. Generally, the authentication result is that the authentication is passed or the authentication is not passed.

This embodiment provides an authentication scheme, and ensures security of a user by authenticating, by the user, a server according to feedback in a process of inputting a user password before the server authenticates the user, and further, transmitted server authentication information is encrypted by using characters in the user password, thereby reducing the risk that the server authentication information is stolen.

This embodiment is further described below through some example embodiments.

In this embodiment, optionally, the first number of characters do not comprise the last character of the user password. For example, the user password is six characters "ABCDEF", the first number is 3, and the first number of characters may be "ABC", "ACD", "DBE" and the like.

As the first number of characters do not comprise the last character of the user password, in this embodiment, the first decryption module 23 can decrypt the first server authentication information before the user inputs the last character of the user password, and the first feedback module 24 can feed back the at least one first authentication response to the user before the user inputs the last character of the user password; correspondingly, the user can confirm whether the at least one first authentication response is in conformity with a preset one before inputting the last character of the user password, that is, the user can determine whether authentication on the server is passed, and stop continuously inputting subsequent characters of the user password when the authentication on the server is not passed, thereby reducing the risk that the user password is stolen.

In this embodiment, optionally, the first number of characters are pre-agreed by the user.

The user can agree on using which characters in his/her own user password to obtain the at least one first key used to encrypt the first server authentication information, that is, the user agrees on a sorted order of each character in the first number of characters in the user password, or agrees on the last character in the first number of characters is which character in the user password, that is, agrees on a sorted order of the last character in the first number of characters in the user password; in this way, the user can expect a character of the user password, and after the moment when the character is input in the password input area, the first decryption module 23 can decrypt the first server authentication information, so that the user can obtain the at least one first authentication response fed back by the first feedback module 24.

In this embodiment, for the second acquisition module 22, which one/ones in at least one character input by the user in the password input area can be a first number of characters used to obtain the at least one second key, can refer to local configuration, or be notified by the server, or be indicated by the user.

In one example embodiment, the same sorted order of characters for obtaining keys in the user password is set in both the server and the authentication apparatus 200. For example, the same sorted order is first to third characters, correspondingly, the server extracts the first to third characters in the user password according to the same sorted order and obtains at least one first key used to encrypt the first server authentication information according to the first to third characters, the second acquisition module 22 acquires the first to third characters input by the user in the password input area according to the same sorted order, and the first decryption module 23 obtains at least one second key used to decrypt the first server authentication information according to the first to third characters.

It should be noted that, the steps of extracting the first number of characters from the user password and obtaining the at least one first key and encrypting by using the at least one first key can be performed by the server or performed by another device. When the steps are performed by the another device, the same sorted order is set in the another device and the authentication apparatus 200, and correspondingly, the another device can send the encrypted first server authentication information to the server.

Figure 2B:
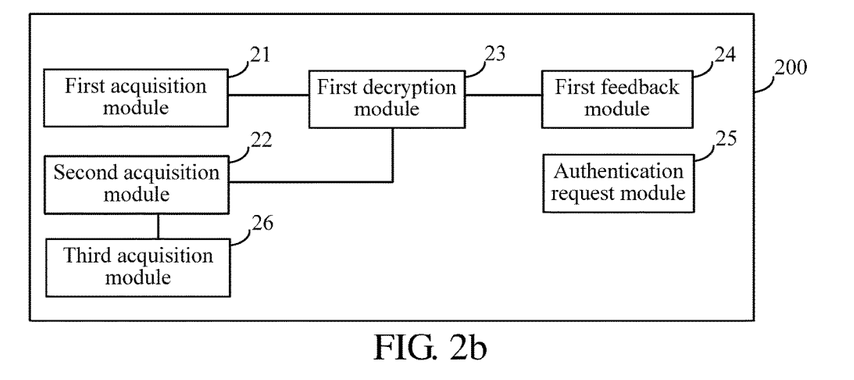

In another example embodiment, as shown in FIG. 2b, the authentication apparatus 200 further comprises: a third acquisition module 26, configured to acquire, from the server, a sorted order of the first number of characters in the user password; and the second acquisition module 22 is configured to: acquire the first number of characters input by the user in a password input area according to the sorted order.

For example, the sorted order acquired by the third acquisition module 26 from the server is first, second and fourth, that is, at least one first key used to encrypt the first server authentication information is obtained from the first, second and fourth characters in the user password; correspondingly, the second acquisition module 22 acquires first, second and fourth characters input by the user in the password input area, and the first decryption module 23 obtains at least one second key used to decrypt the first server authentication information from the input first, second and fourth characters.

Optionally, the first acquisition module 21 and the third acquisition module 26 may acquire the first server authentication information and the sorted order from the server at the same time.

In this embodiment, there may be many kinds of manners of obtaining at least one first key from a first number of characters in a user password of the user, that is, there may be many kinds of key generation strategies. For example, the at least one first key may comprise the first number of characters per se, and/or at least one character obtained after certain conversion of the first number of characters, the conversion comprising: conversion of permutation and combination, and/or corresponding conversion of public and private keys. For example, the first number of characters are "ABC", and the at least one first key may be "ABC", "ABCABC", "AABBCC", or public keys corresponding to private keys "ABC", "ABCABC" and "AABBCC", or the at least one first key comprises "ABC", "ABCABC" and a public key corresponding to a private key "AABBCC".

Correspondingly, the key generation strategy of obtaining the at least one second key should be in conformity with the key generation strategy of obtaining the at least one first key, and for example, the key generation strategy of obtaining the at least one second key can refer to local configuration, or be notified by the server.

In one example embodiment, a corresponding key generation strategy is set in both the server and the authentication apparatus 200. For example, the following key generation strategy is set in both the server and the authentication apparatus: cyclically shift the first number of characters to the left by one bit to obtain a key; correspondingly, the server cyclically shifts the first number of characters in the user password to the left by one bit to obtain a first key used to encrypt first server authentication information according to the key generation strategy and encrypts the first server authentication information by using the first key according to a symmetric encryption algorithm, the second acquisition module 22 acquires a first number of characters input by the user in the password input area, and the first decryption module 23 cyclically shifts the first number of characters to the left by one bit to obtain a second key used to decrypt first server authentication information according to the key generation strategy and decrypts the first server authentication information by using the second key. For another example, the following key generation strategy is set in both the server and the authentication apparatus 200: taking the first number of characters as a private key, that is, decryption key, and taking a public key corresponding to the private key as an encryption key; correspondingly, the server takes a public key corresponding to the first number of characters in the user password as a first key used to encrypt first server authentication information according to the key generation strategy and encrypts the first server authentication information by using the first key according to an asymmetric encryption algorithm, the second acquisition module 22 acquires a first number of characters input by the user in the password input area, and the first decryption module 23 takes the first number of characters as a second key used to decrypt first server authentication information according to the key generation strategy and decrypts the first server authentication information by using the second key.

It should be noted that, the step of obtaining the at least one first key from the first number of characters may be performed by the server or performed by another device. When the step is performed by the another device, a corresponding key generation strategy is set in both the another device and the authentication apparatus 200, and correspondingly, the another device can send the obtained at least one first key to the server, to cause the server to encrypt the first server authentication information by using the at least one first key, or the another device can send the first server authentication information encrypted by using the obtained at least one first key to the server.

Figure 2C:
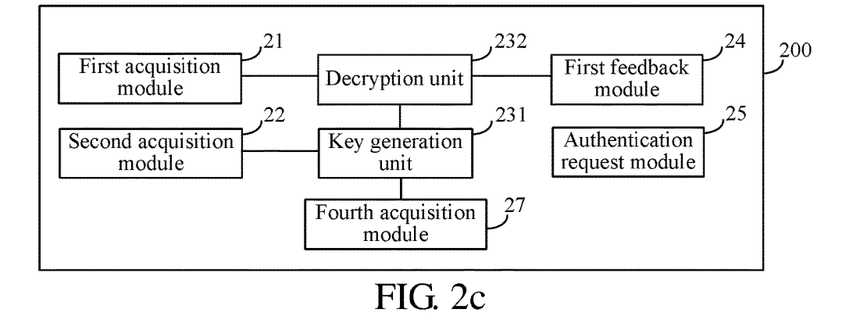

In another example embodiment, as shown in FIG. 2c, the authentication apparatus 200 further comprises: a fourth acquisition module 27, configured to acquire, from the server, a key generation strategy of obtaining the at least one first key from the first number of characters in the user password; and the first decryption module 23 comprises:

a key generation unit 231, configured to obtain at least one second key according to the first number of characters input and the key generation strategy; and a decryption unit 232, configured to decrypt the first server authentication information by using the at least one second key.

For example, the key generation strategy acquired by the fourth acquisition module 27 from the server is taking the first number of characters as a key; correspondingly, the second acquisition module 22 acquires the first number of characters input by the user in the password input area, the key generation unit 231 takes the first number of characters input taken as a second key, and the decryption unit 232 decrypts the first server authentication information by using the second key.

Optionally, the first acquisition module 21 and the fourth acquisition module 27 respectively acquire the first server authentication information and the key generation strategy from the server at the same time.

Optionally, the first acquisition module 21, the third acquisition module 26 and the fourth acquisition module 27 respectively acquire the first server authentication information, the key generation strategy and the sorted order from the server at the same time.

In this embodiment, there may be many kinds of content of the decrypted first server authentication information.

In one example embodiment, the decrypted first server authentication information comprises: the at least one first authentication response. For example, the decrypted first server authentication information comprises an image, and correspondingly, the first feedback module 24 displays the image to the user.

In another example embodiment, the decrypted first server authentication information comprises: a corresponding relation between characters and responses. Correspondingly, the first feedback module 24 is configured to:

determine at least one first authentication response corresponding to at least one character input by the user in the password input area and feed back the at least one first authentication response to the user according to the decrypted first server authentication information.

For example, in the corresponding relation, a character "A" corresponds to an authentication response 1, characters "ABC" corresponds to an authentication response 2, and characters "DCE" corresponds to an authentication response 3.

The at least one first authentication response corresponding to the at least one character input by the user in the password input area may be at least one first authentication response corresponding to all characters input by the user in the password input area, or at least one first authentication response corresponding to the last character input by the user in the password input area, or may comprise at least one authentication response corresponding to each character input by the user in the password input area, which is not limited in this embodiment.

In this embodiment, in order to enhance the strength of authentication on the server, in addition to the first server authentication information, other server authentication information also exists, and correspondingly, the authentication apparatus 200 also feeds back other authentication responses to the user in addition to the at least one authentication response, and the user can determine whether the authentication on the server is passed according to whether all the authentication responses are as expected.

Figure 2D:
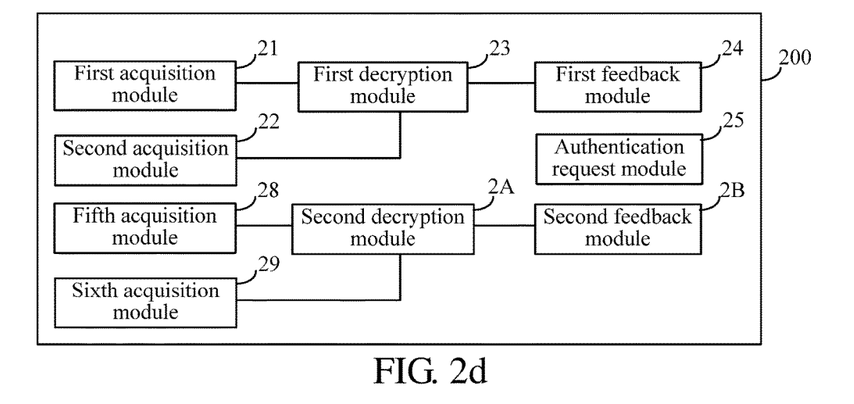

In one example embodiment, as shown in FIG. 2d, the authentication apparatus 200 further comprises:

a fifth acquisition module 28, configured to acquire, from the server, second server authentication information of the user, the second server authentication information being encrypted by using at least one third key obtained from a second number of characters in the user password which are different from the first number of characters;

a sixth acquisition module 29, configured to acquire the second number of characters input by the user in the password input area;

a second decryption module 2A, configured to decrypt the second server authentication information by using at least one fourth key obtained from the second number of characters input; and a second feedback module 2B, configured to feed back at least one second authentication response to the user at least according to the decrypted second server authentication information.

In this example embodiment, the second number may be one, two, or other number.

The second number of characters may be exactly or partially different from the first number of characters. The difference can comprise: different sorted orders of characters in the user password, and/or different values of the characters, and/or different numbers of the characters.

Optionally, the second number of characters comprise at least one character in the user password except the first number of characters. For example, the first number of characters are first to third characters in the user password, the second number of characters are third to fourth characters in the user password, or the second number of characters are third to fifth characters in the user password, or the like.

The at least one third key and the at least one fourth key may be the same or different. If a symmetric encryption algorithm is used, that is, keys used in encryption and decryption are the same, the at least one third key and the at least one fourth key may be the same, and if an asymmetrical encryption algorithm is used, that is, keys used in encryption and decryption are different, the at least one third key and the at least one fourth key may be different. Reference can be made to the description about the at least one first key and the at least one second key for details, which is not repeated herein.

In the example embodiment, the server authentication pass instruction is generally sent by the user after confirming that the at least one first authentication response and the at least one second authentication response are correct.

In this embodiment, there may be many kinds of the authentication request. Optionally, the authentication request comprises: all characters input by the user in the password input area, and/or a decryption success instruction of the first server authentication information, and/or a decryption success instruction of the second server authentication information.

In this regard, the all characters input by the user in the password input area are generally the user password of the user, and correspondingly, the server can verify whether the user password in the authentication request is in conformity with the user password of the user locally stored; optionally, if yes, the authentication of the server on the user is passed, and otherwise, the authentication is not passed.

In one example embodiment, if the first decryption module 23 successfully decrypts the first server authentication information, it indicates that the user correctly inputs the first number of characters, correspondingly, the decryption success instruction of the first server authentication information can notify the server that the user correctly inputs the first number of characters, and correspondingly, the server can determine that the authentication on the user is passed according to the decryption success instruction of the first server authentication information. Optionally, if the first decryption module 23 fails to decrypt the first server authentication information fails, both the first feedback module 24 and the authentication request module 25 cannot complete the corresponding functions, alternatively, the authentication apparatus 200 can send a decryption failure instruction of the first server authentication information to the server, and correspondingly, the server can determine that the authentication on the user is not passed according to the decryption failure instruction of the first server authentication information.

Optionally, if the first decryption module 23 successfully decrypts the first server authentication information and the second decryption module 2A successfully decrypts the second server authentication information, it indicates that the user correctly inputs the first number of characters and the second number of characters, correspondingly, the decryption success instruction of the first server authentication information and the decryption success instruction of the second server authentication information can notify the server that the user correctly inputs the first number of characters and the second number of characters, and correspondingly, the server can determine that the authentication on the user is passed according to the decryption success instruction of the first server authentication information and the decryption success instruction of the second server authentication information.

In one possible application scenario of this embodiment, a user Zhangsan agrees on with a service provider A in advance user name "Zhangsan" and user password "122334" used to log on to a server of the service provider A, as well as first server authentication information about the server, specifically, first server authentication information can comprise that when a character input by the user in the password input area is respectively 1-6, the background color of the password input area is changed into red, orange, yellow, green, purple and white respectively, and further, the user agrees on taking the first two bits of the user password as a first number of characters, and takes the first number of characters as a first key to encrypt the first server authentication information. When a user accesses the server of the service provider A through a browser on his/her own user equipment, the server provides the user equipment with an authentication apparatus 200 in a form of a browser plug-in, or an authentication apparatus 200 is embedded into a webpage script to be provided for the user equipment; at first, the user inputs "Zhangsan" in a user name input area of a browser interface of the server, the authentication apparatus 200 sends the user name "Zhangsan" to the server, and receives first server authentication information corresponding to "Zhangsan", a sorted order of the first number of characters in the user password (i.e., the first and the second) and a key generation strategy (i.e., the first number of characters are taken as a key) returned by the server, when the user inputs two characters sequentially in the password input area, the authentication apparatus 200 takes the two characters as a key to decrypt the first server authentication information received from the server, if the two characters input by the user sequentially in the password input area are 1 and 2 respectively, the authentication apparatus 200 can perform decryption successfully, and otherwise, the decryption fails; if the decryption succeeds, the authentication apparatus 200 changes the background color of the password input area into orange according to the character "2" input by the user just now, the user can continuously input next character "2" after determining that the background color of the password input area being changed into orange is as expected, the authentication apparatus 200 determines not to change the background color of the password input area according to the first server authentication information, the user can continuously input next character "3" after determining that the background color of the password input area remaining orange is as expected, the authentication apparatus 200 changes the background color of the password input area into yellow according to the first server authentication information, the user can continuously input next character "3" after determining that the background color of the password input area being changed into yellow is as expected, the authentication apparatus 200 determines not to change the background color of the password input area according to the first server authentication information, the user can continuously input next character "4" after determining that the background color of the password input area remaining yellow is as expected, the authentication apparatus 200 changes the background color of the password input area into green according to the first server authentication information, the user can click a "login" button after determining that the background color of the password input area being changed into green is as expected, the authentication apparatus 200 receives a server authentication pass instruction triggered by the "login" button, and correspondingly, the authentication apparatus 200 sends an authentication request to the server.

Figure 3:
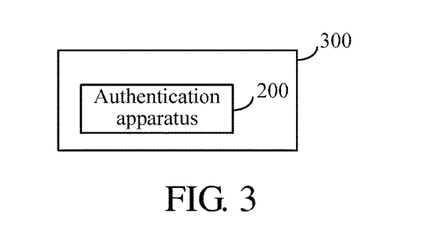
FIG. 3 is a schematic structural diagram of a first example embodiment of a user equipment according to the present application.

FIG. 3 is a schematic structural diagram of a first embodiment of a user equipment according to the present application. As shown in FIG. 3, the user equipment 300 comprises: the authentication apparatus 200 as described in the above authentication apparatus embodiment of the present application.

In this embodiment, the user equipment, for example, may be a smart phone, a PAD, a personal computer or the like.

Optionally, the authentication apparatus 200 can be installed in the user equipment 300 or be uninstalled from the user equipment 300.

Figure 4:
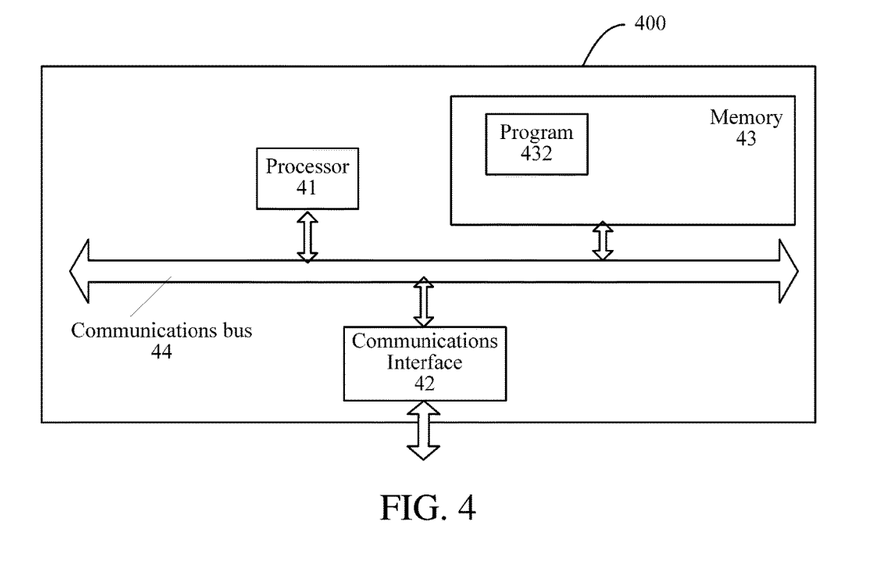
FIG. 4 is a schematic structural diagram of a second example embodiment of a user equipment according to the present application.

FIG. 4 is a schematic structural diagram of a second embodiment of a user equipment according to the present application. As shown in FIG. 4, the user equipment 400 comprises:

a processor 41, a Communications Interface 42, a memory 43, and a communications bus 44.

The processor 41, the Communications Interface 42, and the memory 43 accomplish mutual communications via the communications bus 44.

The Communications Interface 42 is configured to communicate with external devices such as a server.

The processor 41 is configured to execute a program 432, and can implement relevant steps in the authentication method embodiment.

Specifically, the program 432 may comprise a program code, the program code comprising a computer operation instruction.

The processor 41 may be a central processing unit (CPU), or an application specific integrated circuit (ASIC), or be configured to be one or more integrated circuits which implement the authentication method embodiment.

The memory 43 is configured to store the program 432. The memory 43 may comprise a high-speed RAM memory, and may also comprise a non-volatile memory, for example, at least one magnetic disk memory. The program 432 may be configured to cause the user equipment 400 to implement the following steps of:

acquiring, from a server, first server authentication information of a user, the first server authentication information being encrypted by using at least one first key obtained from a first number of characters in a user password of the user;

acquiring the first number of characters input by the user in a password input area;

decrypting the first server authentication information by using at least one second key obtained from the first number of characters input;

feeding back at least one first authentication response to the user at least according to the decrypted first server authentication information; and sending an authentication request to the server based on a server authentication pass instruction of the user, the authentication request being used to request the server to authenticate the user.

Reference can be made to corresponding description in the corresponding steps and units in the authentication method embodiment for implementation of the steps in the program 432, which is not repeated herein. Those skilled in the art can clearly understand that, reference can be made to the corresponding process description in the authentication method embodiment for the devices described above and the specific working procedures of the modules, and will not be repeated herein in order to make the description convenient and concise.

It can be appreciated by those of ordinary skill in the art that each exemplary unit and method step described with reference to the embodiments disclosed herein can be implemented by electronic hardware or a combination of computer software and electronic hardware. Whether these functions are executed in a hardware mode or a software mode depends on particular applications and design constraint conditions of the technical solution. The professional technicians can use different methods to implement the functions described with respect to each particular application, but such example embodiment should not be considered to go beyond the scope of the present application.

If the functions are implemented in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and comprises several instructions for enabling a computer device (which can be a personal computer, a server, or a network device, and the like) to execute all or some steps of the method described in each embodiment of the present application. The foregoing storage medium comprises, a USB disk, a removable hard disk, a read-only memory (ROM), a random access memory (RAM), a magnetic disk, an optical disk or any other mediums that can be configured to store program codes.

The above example embodiments are only intended to describe the present application rather than to limit the present application; various changes and variations can be made by those of ordinary skill in the art without departing from the spirit and scope of the present application, so all equivalent technical solutions also belong to the category of the present application, and the scope of patent protection of the present application should be defined by the claims.

What is claimed is:

1. A method, applied to a user terminal, comprising:
    acquiring first server authentication information of a user from a server, wherein the first server authentication information is encrypted by the server using at least one first key obtained from a first number of characters in a user password of the user;
    acquiring the first number of characters input by the user in a password input area;
    decrypting the first server authentication information by using at least one second key obtained from the first number of characters input to the password input area resulting in decrypted first server authentication information;
    feeding back at least one first authentication response to the user at least according to the decrypted first server authentication information; and
    sending an authentication request to the server based on a server authentication pass instruction of the user, wherein the authentication request is used to request the server to authenticate the user.

2. The method of claim 1, wherein the first number of characters does not comprise a last character of the user password.

3. The method of claim 1, wherein the first number of characters are pre-approved by the user.

4. The method of claim 1, further comprising:
    acquiring, from the server, a sorted order of the first number of characters in the user password, wherein the acquiring the first number of characters input by the user in the password input area comprises:
        acquiring the first number of characters input by the user in the password input area according to the sorted order.

5. The method of claim 1, further comprising:
    acquiring, from the server, a key generation strategy of obtaining the at least one first key from the first number of characters in the user password, wherein the decrypting the first server authentication information by using the at least one second key obtained from the first number of characters input comprises:
        obtaining the at least one second key according to the first number of characters and the key generation strategy; and
        decrypting the first server authentication information by using the at least one second key.

6. The method of claim 1, wherein the feeding back the at least one first authentication response to the user at least according to the decrypted first server authentication information comprises:
    determining at least one first authentication response corresponding to at least one character input by the user in the password input area according to the decrypted first server authentication information; and
    feeding back the at least one first authentication response to the user.

7. The method of claim 1, wherein the server authentication pass instruction is sent by the user after confirming that the at least one first authentication response is correct.

8. The method of claim 1, further comprising, before the sending the authentication request to the server based on the server authentication pass instruction of the user:
    acquiring, from the server, second server authentication information of the user, wherein the second server authentication information is encrypted by using at least one third key obtained from a second number of characters in the user password which are different from the first number of characters;
    acquiring the second number of characters input by the user in the password input area;
    decrypting the second server authentication information by using at least one fourth key obtained from the second number of characters input resulting in decrypted second server authentication information; and
    feeding back at least one second authentication response to the user at least according to the decrypted second server authentication information.

9. The method of claim 8, wherein the second number of characters comprises at least one character in the user password except the first number of characters.

10. The method of claim 8, wherein the server authentication pass instruction is sent by the user after confirming that the at least one first authentication response and the at least one second authentication response are correct.

11. The method of claim 1, wherein the authentication request comprises at least one of: all characters input by the user in the password input area, or a decryption success instruction of the first server authentication information.

12. The method of claim 1, wherein the at least one first authentication response comprises at least one response in at least one form comprising at least one of a hearing, a touch, a vision, a taste, a smell or a temperature.

13. An apparatus, applied to a user terminal, comprising:
a memory that stores executable modules; and
a processor, coupled to the memory, that executes or facilitates execution of the executable modules, comprising:
  a first acquisition module configured to receive, from a server, first server authentication information of a user, wherein the first server authentication information is encrypted by the server using at least one first key obtained from a first number of characters in a user password of the user;
  a second acquisition module configured to receive the first number of characters input by the user in a password input area;
  a first decryption module configured to decrypt the first server authentication information by using at least one second key obtained from the first number of characters resulting in decrypted first server authentication information;
  a first feedback module configured to feed back at least one first authentication response to the user at least according to the decrypted first server authentication information; and
  an authentication request module configured to send an authentication request to the server based on a server authentication pass instruction of the user, wherein the authentication request is used to request the server to authenticate the user.

14. The apparatus of claim 13, wherein the first number of characters does not comprise a last character of the user password.

15. The apparatus of claim 13, wherein the first number of characters are pre-agreed to by the user.

16. The apparatus of claim 13, wherein the executable modules further comprise:
  a third acquisition module configured to receive, from the server, a sorted order of the first number of characters in the user password, and wherein the second acquisition module is configured to:
    receive the first number of characters in the password input area according to the sorted order.

17. The apparatus of claim 13, wherein the executable modules further comprise:
  a fourth acquisition module configured to receive, from the server, key generation information representing a recommendation for generating a key to obtain the at least one first key from the first number of characters in the user password, and wherein the first decryption module comprises:
    a key generation unit configured to obtain at least one second key according to the first number of characters input and the key generation information; and
    a decryption unit configured to decrypt the first server authentication information by using the at least one second key.

18. The apparatus of claim 13, wherein the first feedback module is configured to:
  determine at least one first authentication response corresponding to at least one character input by the user in the password input area according to the decrypted first server authentication information, and feedback the at least one first authentication response to the user.

19. The apparatus of claim 13, wherein the server authentication pass instruction is sent by the user after confirming that the at least one first authentication response is correct.

20. The apparatus of claim 13, wherein the executable modules further comprise:
  a fifth acquisition module configured to receive, from the server, second server authentication information of the user, wherein the second server authentication information is encrypted by using at least one third key obtained from a second number of characters in the user password that are different from the first number of characters;
  a sixth acquisition module configured to receive the second number of characters input by the user in the password input area;
  a second decryption module configured to decrypt the second server authentication information by using at least one fourth key obtained from the second number of characters input resulting in decrypted second server authentication information; and
  a second feedback module configured to feed back at least one second authentication response to the user at least according to the decrypted second server authentication information.

21. The apparatus of claim 20, wherein the second number of characters comprises at least one character in the user password except the first number of characters.

22. The apparatus of claim 20, wherein the server authentication pass instruction is sent by the user after confirming that the at least one first authentication response and the at least one second authentication response are correct.

23. The apparatus of claim 13, wherein the authentication request comprises at least one of: all characters input by the user in the password input area, or a decryption success instruction of the first server authentication information.

24. The apparatus of claim 13, wherein the at least one first authentication response comprises at least one response comprising at least one form of a hearing, a touch, a vision, a taste, a smell or a temperature.

25. A computer readable storage device comprising executable instructions that, in response to execution, cause a device comprising a processor to perform operations, comprising:
  acquiring, from a server, first server authentication information of a user, wherein the first server authentication information is encrypted by the server using a first key obtained from a number of characters in a user password of the user;
  acquiring the number of characters in a password input area of the device;
  decrypting the first server authentication information by using a second key obtained from the number of characters resulting in decrypted first server authentication information;
  feeding back an authentication response to the user at least according to the decrypted first server authentication information; and
  sending an authentication request to the server based on a server authentication pass instruction of the user, wherein the authentication request is used to request the server to authenticate the user.

* * * * *